United States Patent [19]

Bosco

[11] Patent Number: 4,823,921
[45] Date of Patent: Apr. 25, 1989

[54] RIVETED BRAKE ASSEMBLY
[75] Inventor: Robert R. Bosco, Waterbury, Conn.
[73] Assignee: Anstro Manufacturing Co., Inc., Wolcott, Conn.
[21] Appl. No.: 153,400
[22] Filed: Feb. 8, 1988
[51] Int. Cl.⁴ .................. F16D 19/04; F16D 61/00
[52] U.S. Cl. .................... 188/250 G; 188/234; 188/250 B; 411/500; 411/502
[58] Field of Search ......... 188/250 B, 250 G, 234; 411/500, 501, 502, 503, 509, 510

[56] References Cited
U.S. PATENT DOCUMENTS

| 1,054,389 | 2/1913 | Buser | 411/502 X |
|---|---|---|---|
| 1,875,374 | 9/1932 | Gallup | 188/234 |
| 2,096,598 | 10/1937 | Sheane | 188/234 |
| 2,400,015 | 5/1946 | Mathieson | 188/234 |
| 3,505,923 | 4/1970 | Neill | 85/37 |
| 3,767,018 | 10/1973 | Gordon | 188/250 |
| 4,146,118 | 3/1979 | Zankl | 188/250 |
| 4,164,807 | 8/1979 | King, Jr. | 411/501 X |
| 4,293,263 | 10/1981 | Zankle | 411/500 |
| 4,363,580 | 12/1982 | Bell | 411/501 X |

Primary Examiner—Andres Kashnikow
Assistant Examiner—Matthew C. Graham
Attorney, Agent, or Firm—William C. Crutcher

[57] ABSTRACT

A riveted brake assembly comprising a friction pad attached to a metal support plate with rivets. Each rivet comprises a rivet head disposed in a counter bored friction pad hole, a shoulder portion disposed in and filling a small diameter portion of the friction pad hole, a shank portion of lesser diameter than the shoulder portion disposed in the support plate hole, and a tubular tip portion extending beyond said support plate and adapted to be rolled over to secure the friction pad to the support plate. In its preferred form, the rivet is an eyelet of substantially uniform wall thickness, wherein the length and diameter of the rivet shoulder are substantially the same as the length and diameter of the small diameter portion of the friction pad hole.

6 Claims, 2 Drawing Sheets

RIVETED BRAKE ASSEMBLY

BACKGROUND OF THE INVENTION

This invention relates generally to improvements in attaching a friction pad to a metal support plate and more particularly to improvements in a riveted brake assembly in which a brake friction pad is riveted to a metal disc plate or brake shoe used in automobiles and the like.

It has long been a practice to attach friction pads to metal support plates using rivets. Each rivet is clinched in counter sunk or counter bored holes in the friction pad which are aligned with holes in a metal support plate, typical constructions being shown in exemplary U.S. Pat. Nos. 1,875,374-Gallup; 2,096,598-Sheane; and 2,400,015-Mathieson. The types of rivets used in attachment of friction pads to support plates may either be solid, partially solid, or in hollow tubular form, sometimes termed an "eyelet." The rivet includes a cylindrical shank which is inserted through aligned pairs of holes in the friction pad and the support plate and has an enlarged head which rests upon the friction pad in the recessed hole. In the case of an eyelet, the head often most conveniently comprises a flanged end of the tubular member. Thereafter, the rivet is clinched between a driver on the head side and an anvil on the other end designed to curl and upset the tip of the rivet so that it firmly attaches the pad to the support plate and expands laterally into the aligned holes.

Variations in the diameters of the friction pad holes and support plate holes have led to the use of slightly undersized shanks on the rivets in order to accommodate these diametral variations, as well as providing for possible misalignment of the friction pad holes with respect to the support plate holes. This has led to lateral clearances between the outside of the clinched rivet and the friction pad which in turn have allowed the pad to shift laterally on the support plate in the case of extreme braking forces. This is accentuated by variations in thickness of the pad and plate members due to manufacturing tolerances. Particularly, the use of counterbored holes in disk brake pads, when combined with flat disk brake plates, is more prone to lateral shifting of the friction pad than was the case when using counter sunk holes in curved brake linings. Since the friction pads are made of relatively brittle or weak material, the shifting has led to excessive wear or crumbling of the friction pad around the rivet hole which requires premature replacement of the pad.

Various suggestions for overcoming the aforesaid problems have included the proposal of a tapered shank rivet as disclosed in U.S. Pat. 4,146,118-Zankl in which the volume of the rivet shank is calculated to be equal to the volumes of the rivet openings. A tapered rivet head rests in a pad hole which is smaller in diameter than the support plate hole. This construction requires a relatively short cavity in the tip of the solid rivet and depends upon lateral plastic flow of the dead-soft rivet to completely fill the support plate hole with metal.

Rivets for applications other than friction pads have been proposed in the past with a cylindrical shoulder or step between the head and the cylindrical shank. Such types of rivets are well-known for providing hinge pins, in order to provide clearance between the head and the shank as shown in U.S. Pat. No. 3,505,923, for example. However, these rivets require lateral clearance around the shoulder in order to function.

A proposal involving a shoulder on a rivet in a brake assembly is described in U.S. Pat. No. 3,767,018-Gordon for manufacture of a molded friction pad for a brake lining. A rivet with a shoulder is shown pre-clinched on a support plate in U.S. Pat. No. 3,767,018 to provide longitudinal clearance between the rivet head and the shoe prior to the molding step. This method is useful for construction of a brake lining from flowable uncured friction material which could otherwise flow through the rivet hole beneath the head of the rivet. The shoulder of the rivet must be larger than the hole in the support plate and must bear on the support plate in order to prevent leakage of the moldable friction material.

Accordingly, one object of the present invention is to provide an improved rivet brake assembly with an improved rivet for attachment of a friction pad to a metal support plate.

Another object of the invention is to provide an improved brake assembly which reduces wear and lateral shifting of the pad with respect to the support plate.

Still another object of the invention is to provide an improved eyelet rivet for attachment of a friction pad to a metal support plate.

SUMMARY OF THE INVENTION

Briefly stated, the invention is practiced by providing a friction pad member with a plurality of friction pad holes each comprising a large diameter hole and a small diameter hole, a metal support plate member with a plurality of support plate holes aligned with the friction pad holes, and a plurality of rivets disposed in said aligned holes, wherein each rivet comprises a rivet head disposed in the large diameter friction pad hole, integrally formed with a cylindrical shoulder portion disposed in and filling the small diameter friction pad hole, integrally formed with a cylindrical shank portion of lesser diameter than said shoulder portion disposed in the shoe support plate, integrally formed with a tubular tip portion extending beyond said support plate and adapted to be rolled over to secure the friction pad member to the support plate member. In its preferred form, the rivet is a tubular eyelet rivet, of substantially uniform wall thickness, wherein the length and diameter of the cylindrical shoulder portion are substantially the same as the length and diameter of the small diameter portion of the friction pad hole, whereby the shank diameter is on the order of 95 percent of the shoulder diameter and is expanded laterally when it is clinched to contact a major portion of the support plate hole.

DRAWING

Further objects and advantages of the invention will become apparent by reference to the following description, taken in connection with the accompanying drawings in which:

FIG. 1 is an elevation drawing, in section, of portions of a prior art riveted brake assembly with the eyelet rivet shown before clinching, FIG. 2 is a view of the prior art assembly of FIG. 1, with the rivet shown after clinching, FIG. 3 is an elevation drawing, in section, of a portion of a riveted brake assembly according to the preferred embodiment of the present invention shown prior to clinching the rivet, FIG. 4 is the same view of the FIG. 3 assembly after clinching the rivet, and FIG. 5 is an elevation drawing, partly in section, of a modified form of a rivet used in the invention.

DESCRIPTION OF THE PREFERRED EMBODIMENT

Figure 1:
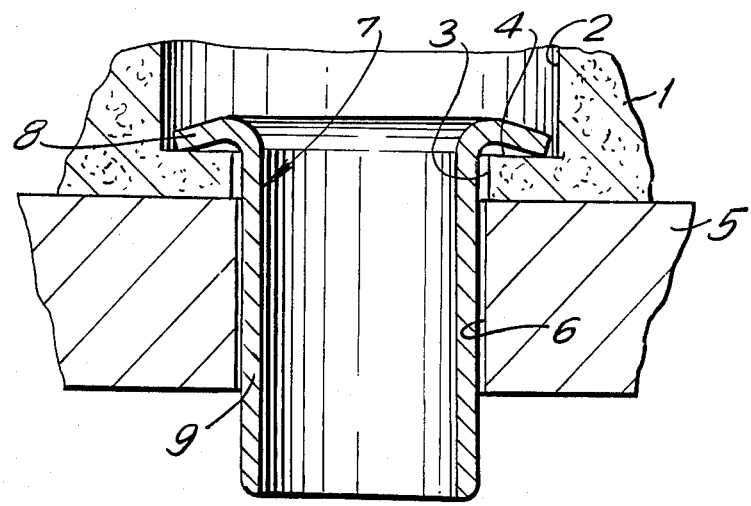

FIG. 1 of the drawing illustrates a portion of a prior art riveted brake assembly comprising a friction pad 1 of material well-known in the art, normally a molded composition suitable for sustaining the high temperatures incurred in braking. Friction pad 1 may comprise a drum brake lining or a disc brake pad or "puck." Friction pad 1 defines a plurality of counter bored holes comprising a large diameter hole portion 2 and a small diameter hole portion 3 joined by a flat rivet head bearing surface 4. The friction pad member abuts a metal support plate member 5 which defines a plurality of support plate holes 6. The support plate holes 6 are normally formed by a metal piercing operation and, as a consequence, are back-tapered so as to increase slightly in diameter from one side of the support plate to the other side. The pad hole 3 is substantially the same in diameter as the support plate hole. Holes 3 and 6 are substantially aligned with one another as a pair. Although only one pair of such holes is shown in FIG. 1, it ill be understood that there are a number of such pairs of aligned holes distributed over the attachment area of the friction pad. A prior art eyelet rivet 7 is shown disposed in aligned holes 3,6. Rivet 7 comprises a head 8 and a tubular cylindrical shank 9. This is sometimes known in the art as a straight barrel, umbrella head eyelet and may either be of ferrous or non-ferrous material. Similar prior art rivets used with the same type of application may have a tapered head. Solid rivets having the same exterior dimensions have also been used.

In order to accommodate manufacturing variations in the friction pad holes 3 and support plate holes 6, the diameter of the tubular shank 9 of the prior art eyelet is normally manufactured undersized to provide a clearance of approximately 0.015 to 0.025 inches between the outside of rivet shank 9 and the friction pad hole 3.

Figure 2:
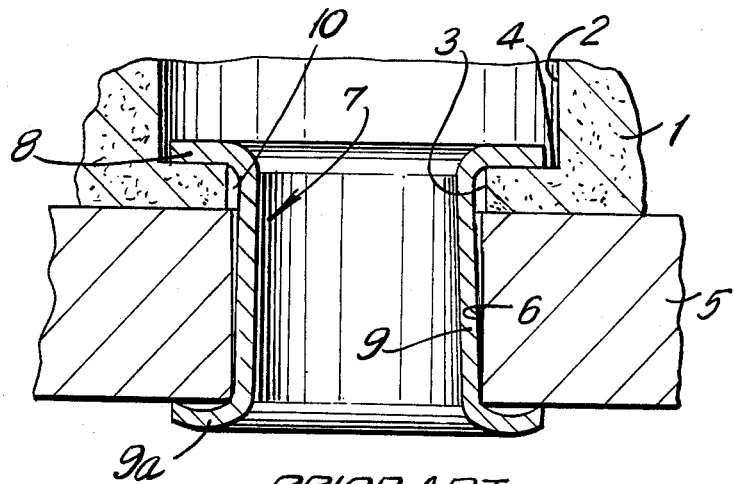

Reference to FIG. 2 of the drawing illustrates the rivet 7 after it is clinched by upsetting or rolling over the outer tip of shank 9 to provide a rolled flange 9a. During this process, the rivet head 8 is flattened against the bearing surface 4 of the friction pad and portions of the end of the shank 9 are expanded into the support plate hole 6 adjacent upset portions 9a. However, a substantial clearance designated by reference numeral 10, is left between shank 9 and hole 3 in the pad. This has led to lateral shifting, and excessive wear and deterioration of the pad under extreme braking conditions.

Figure 3:
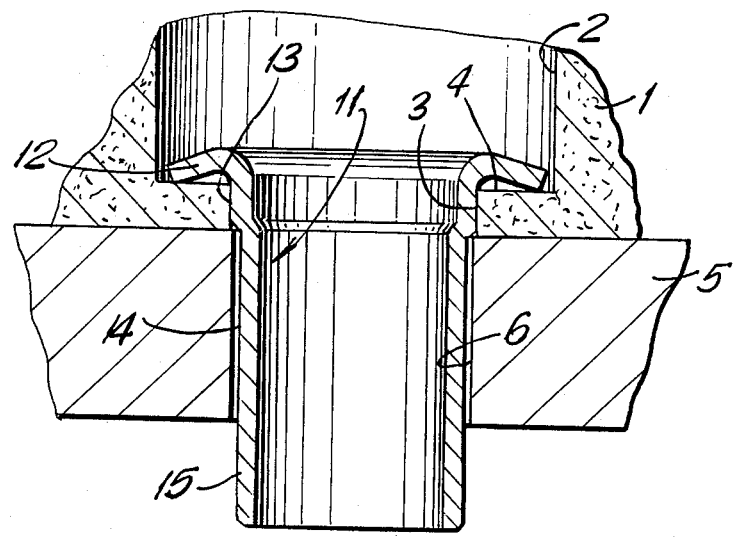
Figure 4:
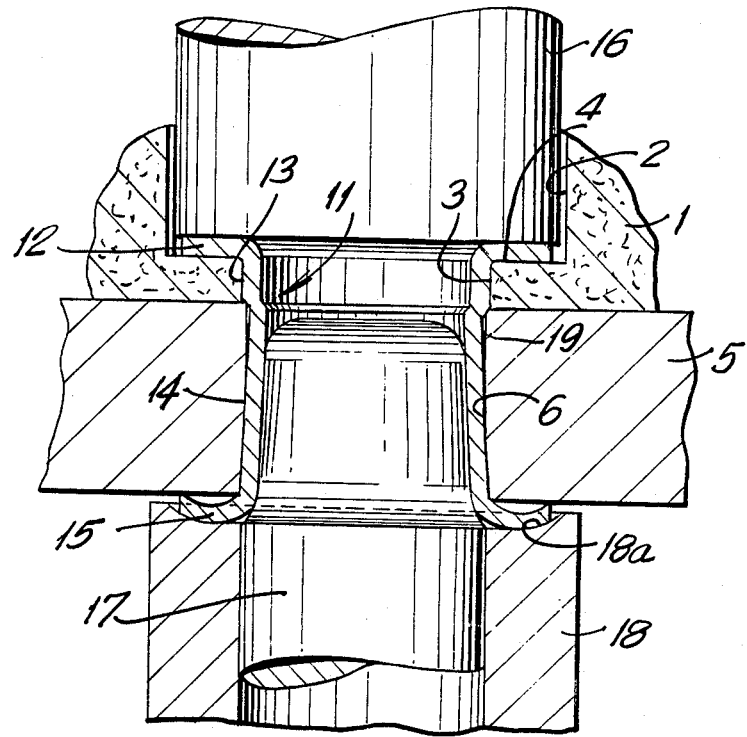

Reference to FIGS. 3 and 4 of the drawing illustrate the improved riveted brake assembly of the present invention. The same reference numbers are used where applicable as in FIGS. 1 and 2. In accordance with the present invention, an eyelet rivet, designated by reference numeral 11 comprises a head portion 12, integrally formed with a cylindrical shoulder portion 13 which is substantially the same length and diameter as the depth and diameter of friction pad hole portion 3. Shoulder 13 is integrally formed with a cylindrical shank portion 14 of lesser diameter than the shoulder portion. Shank portion 14 terminates in a cylindrical tubular tip portion 15 extending beyond support plate 5. The eyelet rivet is hollow and of substantially uniform wall thickness, although it will be understood that commercial eyelets have a slightly greater wall thickness near the head and become gradually thinner toward the tip to facilitate clinching the eyelet tip.

The diameter of the shoulder portion 13 is selected to be approximately the same as or slightly greater than the diameter of the friction pad hole portion 3, so that it fits tightly therein when the rivet 11 is inserted. The cylindrical shank portion 14 is only slightly less in diameter than the shoulder portion 13. Typical dimensions for the improved eyelet rivet in a brake assembly depend upon various factors such as hole dimensions in pad and support plate, thickness of the parts and materials of the rivets. For a standard rivet series known as Series 23 dimensions for my improved rivet according to the invention would be modified to be on the order of 0.225 inches diameter for shoulder 13 and 0.215 inches diameter for shank 14. In this case the shank diameter is approximately 95 percent of the shoulder diameter. By contrast, the diameter of the prior art single diameter Series 23 eyelet shown in FIGS. 1 and 2 might be on the order of 0.210 inches diameter. Other series of standard rivets would be similarly modified in accordance with the present invention to provide shanks with diameters of the order of 93 to 97 percent of the shoulder diameters.

A typical system for clinching the improved eyelet rivet is shown by the clinching tool in its final position in FIG. 4. A driver 16 moves from the top and a pin 17 which is slidable within an anvil 18 moves from the bottom. The pin 17 is inserted through aligned holes 6 and 3 to protrude into hole 2. There it receives the tubular tip portion of the rivet and guides the rivet into holes 3 and 6. Pin 17 retracts to the position shown in FIG. 4 as the driver 16 impacts the rivet head.

FIG. 4 of the of the drawing shows the final clinching position of the pin 17, anvil 18, driver 16, and the clinched rivet 11. Anvil 18 includes an arcuate curling surface 18a to roll the rivet tip and complete the rivet clinching operation as the rivet head 12 is flattened against the bearing surface 4 on the pad by the driver 16. As the head 12 is flattened, the shoulder portion 13 moves downward in the pad hole 3 until the juncture between shoulder 13 and shank 14 is approximately contiguous with the edge of the support plate hole 6. The cylindrical shank portion 14 of the eyelet is laterally expanded by the clinching operation substantially into contact with the walls of the support plate hole 6 along a major portion thereof, preferably at least two-thirds of the depth of the pierced support plate hole 6. Only a very slight clearance is left between rivet 11 and support plate 5 near the top of the plate as indicated at reference numeral 19.

The fact that the cylindrical shank 14 of rivet 11 contacts the walls of the support plate hole over a major portion thereof prevents any lateral shifting of the rivet within the hole. The zero to negative clearance between the shoulder 13 and the friction pad hole 3 prevents any lateral shifting of the pad, which was the problem with the prior art construction illustrated in FIGS. 1 and 2.

Figure 5:
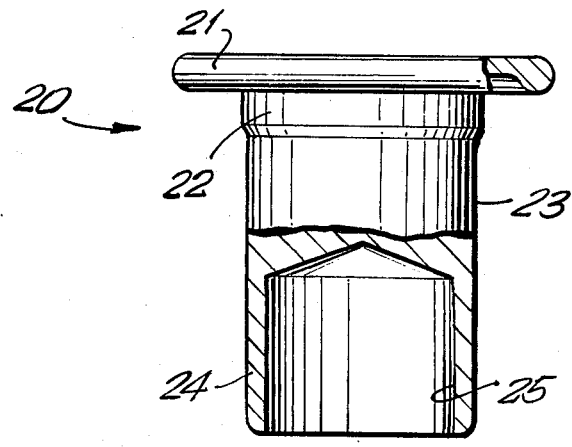

While the invention has been illustrated in its preferred form as an eyelet or hollow rivet, it also can be utilized effectively in a solid rivet as shown in FIG. 5. In this case, a solid rivet shown generally as 20 comprises a head 21 formed integrally with a solid cylindrical shoulder portion 22 formed integrally with a solid or partially solid cylindrical shank portion 23 formed integrally with a tubular tip portion 24. The rivet is solid with the exception of a cavity 25 which extends the length of the tip portion 24 and into the shank portion 23 inside the support plate preferably for a distance of approximately 40 to 45 percent of the support plate thickness.

While there has been described what is considered to be the preferred embodiment of the invention, other modifications will occur to those skilled in the art and it is desired to secure in the appended claims all such modifications as fall within the true spirit and scope of the invention.

I claim:

1. A riveted brake assembly comprising:
   a friction pad defining a plurality of pad holes therethrough each comprising a large diameter hole and a small diameter hole,
   a support plate disposed adjacent said friction pad and defining a plurality of plate holes therethrough,
   said pad holes and said plate holes being substantially aligned in pairs, and
   a plurality of rivets disposed in said holes and securing said friction pad to said support plate, each said rivet comprising a rivet head disposed in said large diameter pad hole, integrally formed with a cylindrical shoulder portion disposed in tight engagement with zero to negative clearance said small diameter pad hole, integrally formed with a cylindrical shank portion only slightly less diameter than said shoulder portion disposed in said plate hole, integrally formed with a tubular tip portion extending beyond said support plate and adapted to be curled over to secure said friction pad to said support plate, wherein said rivet head portion, shoulder portion, shank portion, and tip portion are defined by a hollow member of substantially uniform wall thickness.

2. The combination according to claim 1, wherein said shoulder portion is of substantially the same diameter and longitudinal dimension as the diameter and depth respectively of said small diameter pad hole.

3. The combination according to claim 1, wherein said small diameter pad hole is substantially the same diameter as said plate hole, and wherein said rivet shank portion is expanded upon clinching to contact a major portion of said plate hole.

4. The combination according to claim 1, wherein Said support plate is metal, wherein said friction pad is a molded member of heat resistant material, and wherein said rivet is of ferrous material, 5. The combination according to claim 1, wherein the diameter of said shank portion is on the order of 93 percent to 97 percent of the diameter of said shoulder portion.

6. A riveted brake assembly, comprising:
   a friction pad defining a plurality of pad holes therethrough each comprising a large diameter hole and a small diameter hole,
   a support plate disposed adjacent said friction pad and defining a plurality of plate holes therethrough,
   said small diameter pad holes being substantially the same diameter as said plate hole and substantially aligned therewith,
   a plurality of eyelet rivets comprising hollow ferrous tubular members each having a wall of substantially uniform thickness disposed in said holes and securing said friction pad to said support plate, each said eyelet rivet comprising a rivet head defined by a flanged end of said wall disposed in said large diameter pad hole, integrally formed with a hollow cylindrical shoulder portion disposed in tight engagement with zero to negative clearance said small diameter pad hole and substantially of the same diameter and longitudinal dimension as the diameter and depth respectively of said small diameter pad pole, integrally formed with a cylindrical shank portion having a diameter on the order of 95 percent of the diameter of said shoulder portion disposed in and adapted to be expanded by a clinching operation substantially into contact with the walls of said plate hole along a major portion thereof, integrally formed with a tubular tip portion extending beyond said support plate and adapted to be curled over to secure said friction pad to said support plate.

* * * * *